Feb. 18, 1941.     R. STESKAL     2,232,413
INTERNAL COMBUSTION ENGINE
Filed March 30, 1939
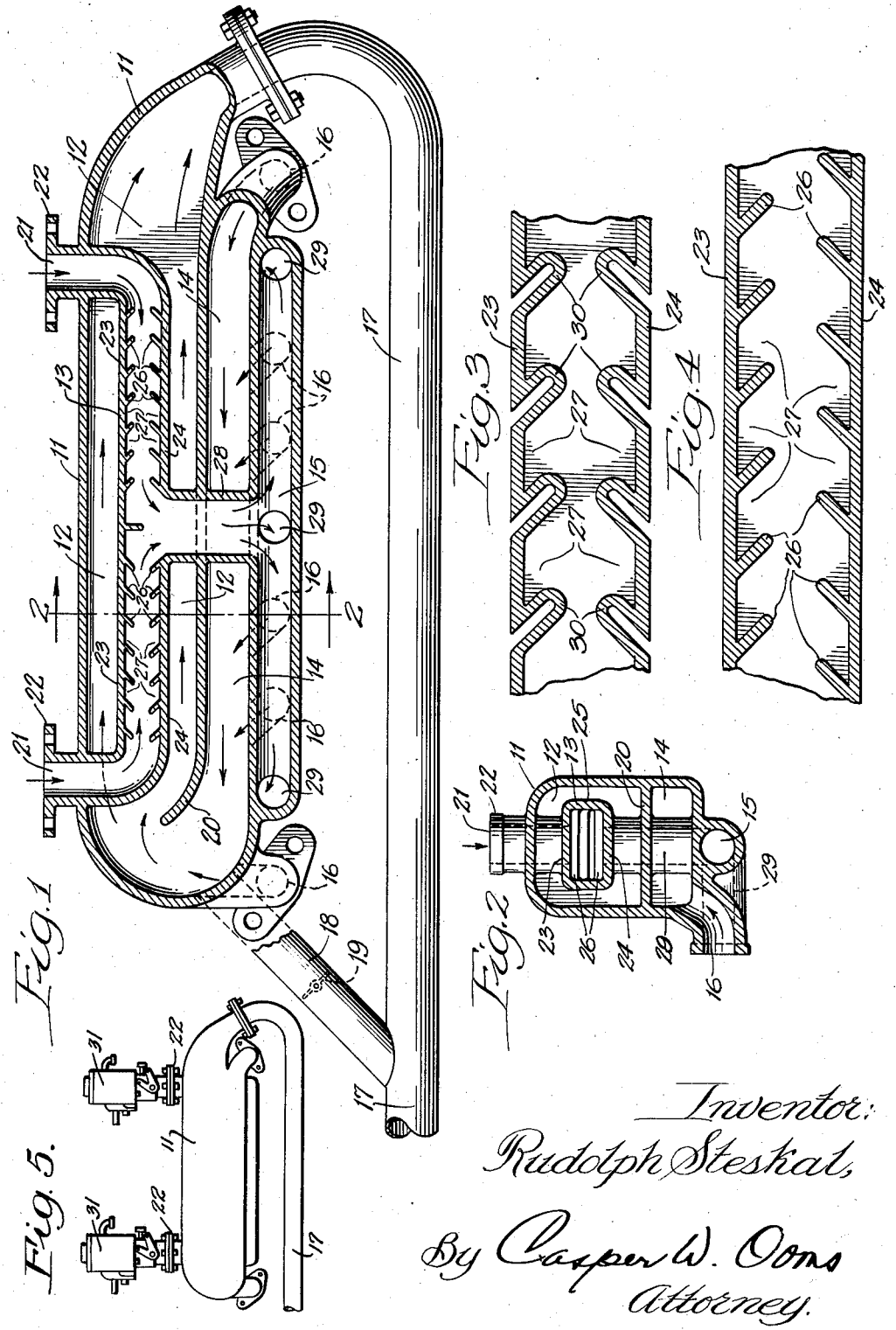

Patented Feb. 18, 1941

2,232,413

UNITED STATES PATENT OFFICE 2,232,413

INTERNAL COMBUSTION ENGINE

Rudolph Steskal, Berwyn, Ill.

Application March 30, 1939, Serial No. 264,915

4 Claims. (Cl. 123—122)

This invention relates to an improvement in an internal combustion engine and more particularly to an improved manifold structure designed to vaporize heavy fuel oils so that they may be used as fuel in standard electrically-ignited internal combustion engines.

An object of the invention is to provide an improved manifold structure wherein fuel may be intensely heated after leaving the carburetor and before entering the intake manifold.

A further object of the invention is to provide within a heating chamber heated by the exhaust gases of the engine a vaporizing passage through which the vaporized fuel may be drawn into the intake manifold without any obstruction to the normal passage of the vaporized fuel.

A further object of the invention is to provide within the vaporizing passage a series of cross walls which may intercept any liquid or condensed fuel carried by the stream of vaporized fuel and retain such liquid until completely vaporized.

A further object of the invention is to provide a series of pockets within the vaporizing passage in which any condensed fuel may collect and be subjected to intense heat and lowered pressure to assist in the vaporization of the condensed fuel.

The primary object of the invention is to provide an exhaust heated vaporizing passage which will entrap any condensed fuel and prevents its entry into the intake manifold and cylinders of the engine, until it has been vaporized.

Other objects, capabilities, and advantages of the invention will appear from the following description thereof taken in conjunction with the drawing, which shows a preferred form of an embodiment of my invention, in which:

Figure 1 is a sectional elevation of the entire manifold structure;

Fig. 2 is a vertical section of the entire manifold structure taken on the line 2—2 of Fig. 1;

Fig. 3 is a sectional detail view of a fragment of the vaporizing passage 13 in Fig. 1 with a modified form of cross walls 30;

Fig. 4 is a sectional detail view of a fragment of the vaporizing passage 13, similar to Fig. 3, with the cross walls 26 placed in staggered relation; and Fig. 5 is an elevation of the manifold structure showing two carburetors connected thereto.

Referring to the drawing, the entire manifold casing is indicated by the numeral 11. The manifold casing is mounted at the side of the internal combustion engine block, adjacent the intake and exhaust ports of the cylinders. The casing is composed of the heating chamber 12, which entirely surrounds an extended horizontally disposed vaporizing passage 13, and is connected with the exhaust manifold 14.

The vaporizing passage 13 leads from a carburetor or carburetors 31 to the intake manifold 15.

Indicated in dotted lines at the lower part of the manifold casing 11 are the exhaust ports 16, all of which lead from the respective cylinders of the internal combustion engine into the exhaust manifold 14. The exhaust manifold 14 is separated from the heating chamber 12 by the partition 20 which is open at one end so that the hot exhaust gases may flow directly from the exhaust manifold 14 into the heating chamber 12 and thence through the exhaust pipe 17 to the muffler, which is not shown.

At one end of the exhaust manifold is shown a by-pass 18 by which the exhaust gases may be conducted directly from the exhaust manifold into the exhaust pipe 17 and thence to the muffler, which is not shown. In the exhaust by-pass 18 is a valve 19. The valve 19 may be manually operated to control the amount of exhaust gases which are to be led directly from the exhaust manifold to the exhaust pipe without passing through the heating chamber, and thus to control the temperature of the heating chamber 12, or automatic thermostatic controls may be provided to maintain a uniform temperature within the heating chamber.

The vaporizing passage 13 is an extended horizontal passage heated by the exhaust gases and connected at the inlets 21 to the carburetor or carburetors 31 by a flange or flanges 22. Each of the flanges 22 is designed to be secured to a corresponding flange on a carburetor or a duct leading therefrom.

The fuel inlets 21 lead directly into the extended horizontal vaporizing passage 13. This vaporizing passage 13 is shown in the drawings as rectangular in section. It may be appropriately formed in circular or partly circular forms without affecting the operating principles involved.

As shown, the vaporizing passage 13 is made up of an upper wall 23, a lower wall 24 and side walls 25, all of which are completely surrounded by the heating chamber 12 through which the exhaust gases are conducted. Within the vaporizing passage 13 are cross walls 26 which, as shown in Fig. 2, connect the side walls 25 and thus form an extended series of pockets 27 at the bottom and at the top of the vaporizing passage. Between the free edges of the cross walls 26 is an uninterrupted passage for the flow of the fuel gases therethrough. It is to be noted that the cross walls 26 are disposed at an acute angle to the top wall 23 and bottom wall 24, in the direction opposite to that of the stream of fuel passing from the carburetors through the vaporizing passage 13.

The vaporizing passage 13 is connected to the intake manifold 15 by means of the vertical riser 28. The vaporizing passage is preferably provided with two inlets 21 and the vertical riser 28 is therefore connected intermediate the ends of the vaporizing passage 13 so that the cross walls 26 are inclined oppositely toward the ends of the passage from its connection with the riser. The intake manifold 15 is connected to the cylinder intake ports 29, of which three are shown in Fig. 1.

In Fig. 3 a fragmentary view of a detail of the vaporizing passage 13 shows modified cross walls which, instead of being made of simple transverse fins, connecting the side walls 25 of the vaporizing passage 13, are constructed in hollow form. In this construction greater surfaces of the cross walls are exposed to the exhaust gases to provide more intense heat within the vaporizing passage 13, and at all sides of the pockets 27.

In Fig. 4, also a sectional view of a fragmentary detail of the vaporizing passage 13, is shown a modification of the vaporizing passage in which the cross walls 26 are staggered so that the free edges of the cross walls 26 attached to the top wall 23 of the vaporizing passage lie intermediate the free edges of the cross walls 26 attached to the bottom wall of the vaporizing passage 13. The staggering of these free edges will insure that any condensed fuel vapor which drips from the edges of the upper cross walls, especially when the internal combustion engine is at rest, will fall within the pockets 27 formed by the successive cross walls.

The operation of the structure heretofore described is as follows:

If the internal combustion engine has been at rest, any fuel vapors within the intake passage below the carburetors which may be condensed upon the interior surfaces of portions of the intake system above the vertical riser 28 will be collected within the pockets 27 of the vaporizing passage 13. When the internal combustion engine is started the vaporized fuels from the carburetor will be drawn through the inlet ports 21, the vaporizing passage 13, the riser 28, and the manifold 15, into the cylinder intake ports 29. The course of the fuel gases is indicated by arrows.

In passing through the vaporizing passage 13, the gas passes through the uninterrupted passage between the cross walls 26. Any condensed droplets or unvaporized liquid will drop out of the stream into the pockets 27. The gases condensed when the engine was at rest also lie within the pockets 27.

When the engine is started the hot exhaust gases from the exhaust ports 16 begin immediately to flow into the exhaust manifold 14 and thence into the heating chamber 12. The walls of the vaporizing passage 13 are heated by these gases, and the heat is conducted by the cross walls 26 from the vaporizing passage walls 23, 24 and 25 into the vaporizing passage and into contact with any condensed fuel that may lie within the pockets 27.

The cross walls 26 serve also to heat the space in the vaporizing passage. The cross walls on the lower wall 24 also intercept any heavy particles of fuel, such as droplets condensing in the fuel stream, which may be carried along by the fuel stream.

At the same time flow of the fuel vapor through the vaporizing passage 13 under suction produced by the operating engine creates areas of low pressure at the mouths of the pockets 27. This low pressure and the increased heat imparted to any condensed fuel within the pockets 27 speeds up the vaporization of this liquid and readily transforms it into fuel vapor which is drawn into the passing stream in the vaporizing passage and through the vertical riser 28 and the intake manifold 15 into the cylinder intake ports 29.

Having thus described my invention, what I claim as new and desire to secure by Letters Patent is:

1. In an internal combustion engine a fuel intake system comprising a carburetor, an intake manifold, and an extended horizontally disposed vaporizing passage between said carburetor and said manifold and heated by the exhaust gases, said vaporizing passage having upper downwardly extending cross walls and lower upwardly extending cross walls both inclined toward the inlet of the passage and forming pockets on the upper and lower walls thereof for the reception and retention of condensed fuel vapors, and a free straight passage between said pockets for the flow of fuel vapor therethrough.

2. In an internal combustion engine a fuel intake system comprising a carburetor, an intake manifold, a horizontally disposed vaporizing passage between said carburetor and said intake manifold enclosed within a chamber through which the hot exhaust gases of the engine flow, a series of cross walls extending downwardly from the top and upwardly from the bottom in an acute angle to the direction of flow within said vaporizing passage forming pockets at the top and bottom thereof, and a free straight passage between the free edges of said cross walls.

3. In an internal combustion engine having a carburetor and an intake manifold, a fuel intake system between said carburetor and the intake manifold comprising a heated chamber heated by the exhaust gases from said engine, a horizontal vaporizing passage within said heated chamber, transverse cross walls within said vaporizing passage extending inwardly from the top and bottom walls of said passage and inclined toward the inlet thereof to form fuel pockets, and a free straight passage between the free edges of said cross walls.

4. In an internal combustion engine, a fuel vaporizer system comprising a casing through which the hot exhaust gases of the engine flow, an intake manifold and a connected vaporizing passage within the casing heated by the exhaust gases, the vaporizing passage having inlets at the ends and a central connection with the manifold, the passage having upper downwardly extending cross walls and lower upwardly extending cross walls both inclined away from the central manifold and toward the ends of the passage forming fuel pockets at the top and bottom of the passage, and a free passage between the free edges of the cross walls.

RUDOLPH STESKAL.